Oct. 18, 1955 R. J. WISE 2,721,231

METHOD AND APPARATUS FOR GENERATING FACSIMILE SIGNALS

Filed Dec. 13, 1951

INVENTOR.
R. J. WISE
BY [signature]
ATTORNEY

United States Patent Office 2,721,231

Patented Oct. 18, 1955

2,721,231

METHOD AND APPARATUS FOR GENERATING FACSIMILE SIGNALS

Raleigh J. Wise, Arlington, N. J., assignor to The Western Union Telegraph Company, New York, N. Y., a corporation of New York Application December 13, 1951, Serial No. 261,560

14 Claims. (Cl. 178—69.5)

The present invention relates to telegraphic communications by facsimile and more particularly to a novel and improved method and apparatus for generating facsimile telegraph signals.

In a facsimile telegraph system, accurate and reliable phasing of the transmitting and recording scanning apparatus is essential to efficient and satisfactory operation. Phasing is generally accomplished through transmission of an accurately timed electrical impulse from the transmitter to the receiver.

The principal object of the present invention is to provide a novel and improved means for generating phasing impulses.

Another object of the invention is to provide a novel and improved means for suppressing transmission of facsimile intelligence signals while a phasing impulse is being generated.

Further objects of the invention will appear from the following description.

In accordance with the invention, these objects are achieved by scanning a transmitting blank having the subject matter to be transmitted delineated thereon thereby to produce a facsimile intelligence signal and periodically to produce a phasing signal, selectively transmitting either said phasing signal or said facsimile intelligence signal, and employing said phasing signal periodically to suppress transmission of said facsimile signal.

The invention will now be described in greater detail with reference to the appended drawing in which.

Figures 1, 2, 3:
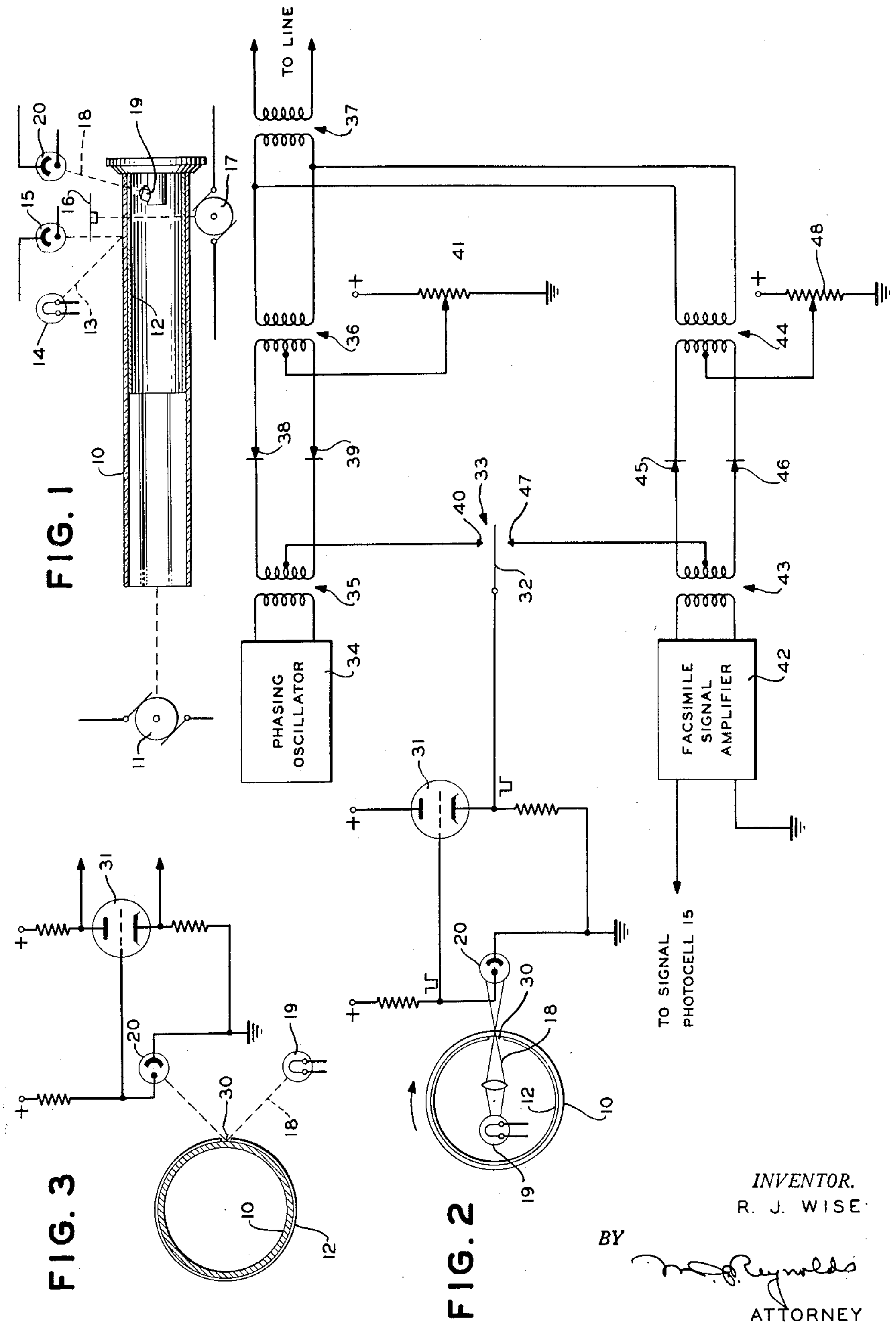
Fig. 1 illustrates schematically a suitable arrangement for generating phasing pulses and facsimile intelligence signals in accordance with the invention.
Fig. 2 illustrates a suitable circuit arrangement for transmitting the phasing pulses and facsimile telegraph signals.
Fig. 3 illustrates a modification of a portion of the arrangement of Fig. 2.

Referring now to the drawing and more particularly to Fig. 1, there is shown a portion of a facsimile transmitter including a hollow transparent cylindrical drum member 10 rotated by an electric motor 11. A message blank 12 having the subject matter to be transmitted delineated thereon is rolled and inserted in drum 10 in such a manner that a gap extending longitudinally along drum 10 is provided in blank 12.

A light beam 13 from a lamp 14 is directed onto drum 10 and is reflected from message blank 12 onto a signal photocell 15. The varying reflectivity provided by marked and unmarked areas of blank 12 produces a variation in intensity of illumination striking photocell 15. Modulation of the variations in light intensity on a carrier frequency is effected by a chopper disk 16 interposed in the path of the light beam and rotated by an electric motor 17.

Scanning of message blank 12 to produce a facsimile signal is effected by rotating drum 10 and by causing the carriage carrying lamp 14 and photocell 15 to travel longitudinally along drum 10.

A light beam 18 from a lamp 19 located within drum 10 is directed onto a photocell 20, thereby scanning a circular section of message blank 12. The output of photocell 20 consists of a train of pulses having a frequency corresponding to the speed of rotation of drum 10 and having leading and trailing edges occurring, respectively, when the leading and trailing edges of the message blank gap unmask and mask, respectively, light beam 18.

It is evident that, during operation, facsimile intelligence signals are generated continuously in photocell 15 while a control pulse from photocell 20 is generated once each revolution of drum 10.

Referring now to Fig. 2, drum 10 together with message blank 12 are rotated in a clockwise direction. When gap 30 in message blank 12 unmasks light beam 18, a negative going voltage pulse is produced at the anode of photocell 20 as described above. This negative going pulse, which may be termed a control pulse or a phasing pulse, is applied to the control grid of a cathode follower amplifier tube 31 and is repeated at the cathode thereof. The cathode of tube 31 is connected to a tongue 32 of a single pole double throw switch 33.

A phasing wave, which may be an oscillation of any suitable frequency, is generated in a phasing oscillator 34 and applied through transformers 35, 36 and 37 to an output line which may be connected through any suitable communication channel to an associated facsimile receiver. A pair of rectifiers 38 and 39 are interposed, respectively, in each side of the connection between the secondary of transformer 35 and the primary of transformer 36.

When the center tap of the secondary winding of transformer 35 is floating, i. e., when tongue 32 is not made with upper contact 40 of switch 33, only the output of the phasing oscillator is applied to rectifiers 38 and 39. In this condition rectifiers 38 and 39 will block on alternate half cycles and will prevent transmission of the phasing wave. Rectifiers 38 and 39 are so poled that when tongue 32 is made with contact 40 and a negative pulse appears at the cathode of tube 31, rectifiers 38 and 39 will conduct, transmitting the phasing wave to the output line for a time interval determined by the duration of the control pulse at the cathode of tube 31. Since the cathode of tube 31 is normally maintained at a positive potential with respect to ground, a bias voltage tending to keep rectifiers 38 and 39 from conducting is applied thereto. To overcome this bias so that a relatively small negative pulse at the cathode of tube 31 will cause conduction of rectifiers 38 and 39, the center tap of the primary winding of transformer 36 is returned to a source of positive potential through a potentiometer 41.

Since rectifiers 38 and 39 conduct solely when a negative control pulse from the cathode of tube 31 is applied thereto, it is evident that the phasing output will consist of a train of phasing wave pulses having a repetition rate dependent on the speed of rotation of drum 10. The duration of each phasing pulse will be determined in part by the speed of rotation of drum 10 and in part by the width of gap 30. The width of gap 30 is, of course, determined by the width of message blank 12 relative to the circumference of drum 10.

The output of the signal photocell, i. e., photocell 15 of Fig. 1, is amplified in a signal amplifier 42 and applied to the output line through transformers 43, 44 and 37. A pair of rectifiers 45 and 46 are interposed, respectively, in each side of the connection between the secondary winding of transformer 43 and the primary winding of transformer 44.

The center tap of the secondary winding of transformer 43 is connected to a lower contact 47 of switch 33 so that, when switch 33 is in its lower position, the negative control pulses from the cathode of tube 31 will be applied to rectifiers 45 and 46. Rectifiers 45 and 46 are so poled that these negative pulses will render them nonconductive. In the absence of a negative pulse, rectifiers 45 and 46 may be rendered conductive by the facsimile intelligence signal, so that the facsimile intelligence signal will normally be transmitted to the output line. The center tap of the primary winding of transformer 44 is returned to a source of positive potential through a potentiometer 48 so that the positive bias therefrom will counteract the positive potential from the cathode of tube 31. The positive bias may be adjusted so that rectifiers 45 and 46 cannot be rendered conductive until the amplitude of the facsimile intelligence signal exceeds the positive bias. In this manner, signals representing background marks are suppressed.

Prior to transmission of facsimile intelligence signals, tongue 32 is moved into engagement with contact 40 so that phasing pulses may be transmitted. After a predetermined time interval, or when phasing is achieved, tongue 32 is moved into engagement with contact 47, so that facsimile intelligence signals may be transmitted instead of phasing signals.

In order to prevent marking of the recording copy sheet when photocell 15 scans gap 30 in message blank 12, it is important that transmission of facsimile intelligence signals be suppressed during scanning of gap 30. Since gap 30 is scanned by photocell 20 at substantially the same time as it is scanned by photocell 15, the control pulse output of photocell 20 which is applied to rectifiers 45 and 46, as described above, serves as a blanking pulse and suppresses transmission of facsimile intelligence signals during the time gap is being scanned.

In Fig. 3 there is shown an arrangement wherein the control pulses are generated through differences in reflectivity rather than transparency as in Fig. 2. More specifically, in Fig. 3, light beam 18 from lamp 19 is directed onto message drum 10 and reflected therefrom onto photocell 20. In this embodiment of the invention, the message drum is preferably opaque and the transmitting blank is disposed on the outside thereof. The intensity of the illumination impinging on photocell 20 will depend on the reflectivity of the reflecting surface. Accordingly, the current flowing through photocell 20 when light beam 18 is reflected from the message blank will be different from the current flowing therethrough when beam 18 is reflected from drum 10, i. e., when gap 30 is disposed in the path of beam 18.

With a highly polished drum surface, the reflectivity will generally be greater when the gap is scanned than when the message blank is scanned. In this condition, the output of photocell 20, generated by scanning gap 30, will be a negative pulse, so that the control pulse applied to tongue 32 may be derived from the cathode of tube 31, as in Fig. 2.

Where the reflectivity of the message blank is greater than that of the drum, as where the message blank is a glossy photographic paper, the output of photocell 20, generated by scanning gap 30, will be a positive pulse, so that the control pulse applied to tongue 32 may be derived from the anode of tube 31.

While the invention has been described in specific embodiments thereof and in a specific use, it is not desired that it be limited thereto for obvious modifications thereof will occur to those skilled in the art without departing from the spirit and scope of the invention as set forth in the appended claims. More particularly, the apparatus disclosed in Figs. 1, 2 and 3 hereof are not the only apparatus which may be used to practice the method of the invention. Many other forms of apparatus may be employed therefor. For example, another suitable arrangement is disclosed in the copending patent application of L. G. Pollard et al. Serial No. 261,461, filed concurrently herewith.

What is claimed is:

1. Facsimile transmission apparatus, comprising scanning means for lineally scanning a transmitting blank having the subject matter to be transmitted delineated thereon, means operative during each lineal cycle of the scanning operation to produce a facsimile signal and other means including a photocell operative periodically during each lineal cycle to produce a control signal having a given duration, an output circuit, normally conductive means to apply said facsimile signal to said output circuit, and circuit means including a relay responsive to said control signal periodically to render said normally conductive means non-conductive for a time interval related to said given duration.

2. Facsimile transmission apparatus, comprising scanning means for lineally scanning a transmitting blank having the subject matter to be transmitted delineated thereon, means operative during each lineal cycle of the scanning operation to produce a facsimile signal and other means including a photocell operative periodically during each lineal cycle to produce a control signal having a given duration, an output circuit, normally conductive means to apply said facsimile signal to said output circuit, and circuit means including a relay responsive to said control signal periodically to render said normally conductive means non-conductive for a time interval at least as great as said given duration.

3. Facsimile transmission apparatus, comprising scanning means for lineally scanning a transmitting blank having the subject matter to be transmitted delineated thereon, mean operative during each lineal cycle of the scanning operation to produce a facsimile signal and other means including a photocell operative periodically during each lineal cycle to produce a control signal having a given duration, an output circuit, normally conductive means to apply said facsimile signal to said output circuit, circuit means including a relay responsive to said control signal periodically to render said normally conductive means non-conductive for a time interval at least as great as said given duration, and means selectively to apply said control signal to said output circuit as a phasing signal.

4. Facsimile transmission apparatus, comprising first scanning means for scanning a rolled transmitting blank having the subject matter to be transmitted delineated thereon to produce a facsimile signal and in which the adjacent edges of the rolled blank are spaced from each other by a longitudinal gap, second scanning means for scanning a generally circular section of said transmitting blank thereby periodically to produce a generally rectangular electrical impulse having a time duration determined by the width of the gap between the adjacent edges of said transmitting blank, an output circuit, normally conductive means to apply said facsimile signal to said output circuit, and means responsive to said electrical impulse to render said normally conductive means non-conductive for at least said time duration.

5. Facsimile transmission apparatus, comprising first scanning means for scanning a rolled transmitting blank having the subject matter to be transmitted delineated thereon to produce a facsimile signal and in which the adjacent edges of the rolled blank are spaced from each other by a longitudinal gap, second scanning means for scanning a generally circular section of said transmitting blank thereby periodically to produce a generally rectangular electrical impulse having a time duration determined by the width of the gap between the adjacent edges of said transmitting blank, an output circuit, normally conductive means to apply said facsimile signal to said output circuit, means responsive to said electrical impulse to render said normally conductive means nonconductive for at least said time duration, and means selectively to apply said electrical impulse to said output circuit as a phasing impulse.

6. Facsimile transmission apparatus, comprising first scanning means for scanning a rolled transmitting blank having the subject matter to be transmitted delineated thereon to produce a facsimile signal and in which the adjacent edges of the rolled blank are spaced from each other by a longitudinal gap, second scanning means for scanning a generally circular section of said transmitting blank thereby periodically to produce a generally rectangular electrical impulse having a time duration substantially coextensive with scanning of said gap by said first and second scanning means, an output circuit, normally conductive means to apply said facsimile signal to said output circuit, means responsive to said electrical impulse to render said normally conductive means nonconductive for at least said time duration, and means selectively to apply said electrical impulse to said output circuit as a phasing impulse.

7. Facsimile transmission apparatus, comprising a transparent generally cylindrical drum member for holding therein a rolled transmitting blank having the subject matter to be transmitted delineated thereon and in which the adjacent edges of the rolled blank are spaced from each other by a longitudinal gap, first scanning means for scanning said transmitting blank to produce a facsimile signal, second scanning means for scanning a generally circumferential section of said transmitting blank thereby periodically to produce a generally rectangular electrical impulse having a time duration substantially coextensive with scanning of said gap by said first and second scanning means, said second scanning means comprising a source of illumination and a photocell one of which is disposed within said drum member and the other disposed without the drum member, so that said message blank masks said photocell except when said gap is disposed between said source and said photocell, an output circuit, normally conductive means to apply said facsimile signal to said output circuit, means responsive to said electrical impulse to render said normally conductive means nonconductive for at least said time duration, and means selectively to apply said electrical impulse to said output circuit as a phasing impulse.

8. Facsimile transmission apparatus, comprising a transparent generally cylindrical drum member for holding therein a rolled transmitting blank having the subject matter to be transmitted delineated thereon and in which the adjacent edges of the rolled blank are spaced from each other by a longitudinal gap, first scanning means for scanning said transmitting blank to produce a facsimile signal, second scanning means for scanning a generally circumferential section of said transmitting blank thereby periodically to produce a generally rectangular electrical impulse having a time duration substantially coextensive with scanning of said gap by said first and second scanning means, said second scanning means comprising a source of illumination and a photocell one of which is disposed within said drum member and the other disposed without the drum member, so that said message blank masks said photocell except when said gap is disposed between said source and said photocell, an ouput circuit, normally conductive means to apply said facsimile signal to said output circuit, and means responsive to said electrical impulse to render said normally conductive means nonconductive for at least said time duration.

9. Facsimile transmission apparatus, comprising an opaque generally cylindrical drum member for holding thereon a rolled transmitting blank having the subject matter to be transmitted delineated thereon and in which the adjacent edges of the rolled blank are spaced from each other by a longitudinal gap, said drum member having a different reflectivity than said transmitting blank, first scanning means for scanning said transmitting blank to produce a facsimile signal, second scanning means for scanning a generally circumferential section of said transmitting blank thereby periodically to produce a generally rectangular electrical impulse having a time duration substantially coextensive with scanning of said gap by said first and second scanning means, said second scanning means comprising a source of illumination and a photocell disposed relative to each other so that illumination from said source is reflected from said generally circumferential section onto said photocell, an output circuit, normally conductive means to apply said facsimile signal to said output circuit, means responsive to said electrical impulse to render said normally conductive means nonconductive for at least said time duration, and means selectively to apply said electrical impulse to said output circuit as a phasing impulse.

10. Facsimile transmission apparatus, comprising an opaque generally cylindrical drum member for holding thereon a rolled transmitting blank and having the subject matter to be transmitted delineated thereon and in which the adjacent edges of the rolled blank are spaced from each other by a longitudinal gap, said drum member having a different reflectivity than said transmitting blank, first scanning means for scanning said transmitting blank to produce a facsimile signal, second scanning means for scanning a generally circumferential section of said transmitting blank thereby periodically to produce a generally rectangular electrical impulse having a time duration substantially coextensive with scanning of said gap by said first and second scanning means, said second scanning means comprising a source of illumination and a photocell disposed relative to each other so that illumination from said source is reflected from said generally circumferential section onto said photocell, an output circuit, normally conductive means to apply said facsimile signal to said output circuit, and means responsive to said electrical impulse to render said normally conductive means nonconductive for at least said time duration.

11. In facsimile transmission apparatus having a member for supporting a transmitting blank bearing the subject matter to be transmitted, in which a portion of said supporting member extends beyond the edges of the blank in the direction in which lineal scanning proceeds, and having means which lineally scans the blank and said extending portion of the supporting member; means operative during successive lineal cycles of the scanning operation to produce facsimile pickup signals and other means including a photocell operative to produce a control signal correlated to the time interval in each lineal cycle in which scanning of said extending portion occurs, an output circuit, means for transmitting the facsimile pickup signals over the output circuit, and means controlled by said control signals and operative to prevent transmission of the facsimile pickup signals when scanning said extending portion of the supporting member.

12. Apparatus according to claim 11, comprising means including a first photocell operative to produce the facsimile pickup signals, and means including a second photocell operative to produce the control signals.

13. Apparatus according to claim 11, including signal generating means controlled by said control signals for periodically transmitting phasing signals over said output circuit, and switching means selectively operable for causing the control signals either to control the transmission of said phasing signals or to control the transmission of said facsimile pickup signals.

14. In facsimile transmission apparatus having means for lineally scanning a rolled transmitting blank bearing the subject matter to be transmitted and in which the adjacent edges of the rolled blank are spaced from each other by a longitudinal gap; means operative during successive lineal cycles of the scanning operation to produce facsimile pickup signals and other means including a photocell operative during each of said lineal cycles to produce a control signal having a time duration correlated to the width of said gap, an output circuit, means for transmitting the facsimile pickup signals over the output circuit, and means controlled by said control signals and operative to prevent the transmission of the facsimile pickup signals over the output circuit when scanning said gap.

References Cited in the file of this patent

UNITED STATES PATENTS

| | | |
|---|---|---|
| 2,315,362 | Wise | Mar. 30, 1943 |
| 2,540,922 | Wickham | Feb. 6, 1951 |
| 2,556,970 | McFarlane | June 12, 1951 |